United States Patent [19]

Phillips et al.

[11] 4,453,118

[45] Jun. 5, 1984

[54] STARTING CONTROL CIRCUIT FOR A MULTISPEED A.C. MOTOR

[75] Inventors: Graham R. Phillips, St. Louis; Marvin J. Fisher, Ballwin, both of Mo.

[73] Assignee: Century Electric, Inc., St. Louis, Mo.

[21] Appl. No.: 440,156

[22] Filed: Nov. 8, 1982

[51] Int. Cl.³ .............................................. H02P 1/44
[52] U.S. Cl. ..................................... 318/779; 318/396; 318/786
[58] Field of Search ............................... 318/772–779, 318/785–795, 101–104, 305, 318, 326–328, 396, 495

[56] References Cited

U.S. PATENT DOCUMENTS

| | | | |
|---|---|---|---|
| 2,669,683 | 2/1954 | Burdett | 318/775 |
| 2,728,038 | 12/1955 | Koch | 318/775 |
| 3,150,306 | 9/1964 | Cantonwine | 318/797 |
| 3,237,072 | 2/1966 | Cantonwine | 318/797 |
| 4,030,009 | 6/1977 | Halsted | 318/772 |
| 4,066,937 | 1/1978 | Pfarrer | 318/775 |
| 4,082,989 | 4/1978 | Pfarrer | 318/775 |
| 4,263,540 | 4/1981 | Brandt et al. | 318/775 |
| 4,348,626 | 9/1982 | London | 318/775 |
| 4,388,581 | 6/1983 | Bhatnagar | 318/789 |

Primary Examiner—G. Z. Rubinson
Assistant Examiner—Arthur G. Evans
Attorney, Agent, or Firm—Rogers, Eilers & Howell

[57] ABSTRACT

This disclosure depicts a starting control circuit for a multispeed alternating current motor having at least two run windings and at least two start windings and a mechanical rotational output. The circuit comprises:

an alternating current source;

speed selector means for connecting one of the run windings and start windings to the alternating current source;

speed selector sensing means connected to the speed selector means for sensing the connection determined by the speed selector means and for producing a speed selection signal indicative thereof;

sensor means for sensing a predetermined amount of rotational movement of the mechanical rotational output and for producing a sensor signal indicative thereof;

pulse rate selector means responsive to the speed selection signal and to the sensor signal for producing a pulse rate signal;

start controller means responsive to the pulse rate signal for producing a control signal;

energizing means connected to the start windings and responsive to the control signal for connecting and disconnecting the alternating current source to the selected one of the start windings in response to the control signal of the start controller means.

23 Claims, 7 Drawing Figures

STARTING CONTROL CIRCUIT FOR A MULTISPEED A.C. MOTOR

CROSS REFERENCE TO RELATED APPLICATIONS

This application is related to copening application Ser. No. 06/263,967, filed May 15, 1981, now U.S. Pat. No. 4,382,217, of common ownership herewith. The subject matter of application Ser. No. 06/263,967, now U.S. Pat. No. 4,382,217, is incorporated herein by reference.

BACKGROUND OF THE INVENTION

This invention relates generally to control circuits for electric motors and more particularly to an improved electronic starting control circuit for a multi-speed alternating current motor.

Single phase alternating current motors normally include a start winding in addition to one or more run windings. The start winding and run winding are generally physically displaced from each other on the stator of the motor and carry currents that are displaced in phase. To start such motors, both windings are connected to a single phase alternating current supply line and, because of the phase displacement between their currents, starting torque is developed. As the motor approaches operating speed, it is known that it is desirable to disconnect the start winding from the supply line in order to operate the motor more efficiently. Additionally, since most start windings are designed to be energized for only very short periods of time, they are not designed to carry current for longer periods of time, and failure to disconnect the start winding from the alternating current source would probably result in serious damage to the start winding. Heretofore, the disconnection of the start winding from the alternating current source has commonly been accomplished by use of a mechanical centrifugal switch in the start winding circuit. Such mechanical switches are relatively inexpensive devices but have a life span which is usually substantially shorter than the life span of various electronic switching devices. In order to take advantage of the longer life span of electronic switching devices, voltage and current relays including solid state switches have been utilized to disconnect the start winding from the alternating current source. However, this approach to disconnecting motor start windings has the disadvantage that for different size motors, different circuits must be utilized. As a result, this solution has proved to be uneconomical.

A novel solution to the problem of electronically disconnecting the start winding is disclosed and claimed in the referenced copending application. A starting control circuit is provided with an alternating current motor having a run winding and a start winding and a mechanical rotational output. The motor is powered by an alternating current source. A reference oscillator produces pulses having a reference frequency. A first control circuit is provided for counting the number of reference pulses produced during a predetermined number of cycles of the alternating current source. A sensor is provided for sensing a predetermined amount of rotational movement of the mechanical rotational output of the motor and producing a sensor pulse indicative thereof. A second control circuit is provided for counting the number of reference pulses produced during the time between the predetermined number of sensor pulses and for comparing the counts on the first and second control circuits. The second control circuit assumes first and second output states dependent on the relationship between the first and second output counts. A switch is connected to the second control circuit, the alternating current source and the start winding for connecting and disconnecting the alternating current source and the start winding in response to the output state of the second control circuit.

The present invention uniquely adapts the invention of the referenced copending application for use with multispeed motors and specifically for use with a single phase, two-speed induction motor. These two-speed motors are normally provided with two run windings and two start windings and operate in a manner similar to the above-described single-speed motors. When one set of windings is energized, the motor will run close to the synchronous speed for the pole and supply frequency combination of that winding. Similarly, the other set of windings produce a different synchronous speed. The present invention allows the features of the referenced copending application to be used with two-speed induction motors.

SUMMARY OF THE INVENTION

The novel invention is a starting control circuit for a multispeed alternating current motor having at least two run windings and at least two start windings and a mechanical rotational output. The circuit comprises:

an alternating current source;

speed selector means for connecting one of the run windings and start windings to the alternating current source;

speed selector sensing means connected to the speed selector means for sensing the connection determined by the speed selector means and for producing a speed selection signal indicative thereof;

sensor means for sensing a predetermined amount of rotational movement of the mechanical rotational output and for producing a sensor signal indicative thereof.

pulse rate selector means responsive to the speed selection signal and to the sensor signal for producing a pulse rate signal;

start controller means responsive to the pulse rate signal for producing a control signal;

energizing means connected to the start windings and responsive to the control signal for connecting and disconnecting the alternating current source to the selected one of the start windings in response to the control signal of the start controller means.

OBJECTS OF THE INVENTION

An object of the present invention is the provision of a starting control circuit for a multispeed alternating current motor which utilizes electronic components in both an accurate and an economical fashion.

Another object of the present invention is the provision of a starting control circuit for a multispeed alternating current motor which may be utilized over a wide range of motor sizes and with motors having a wide range in the number of motor poles.

A still further object of the present invention is the provision of a starting control circuit for a multispeed alternating current motor which will operate accurately over a wide range of line frequencies.

Another object of the present invention is the provision of a starting control circuit for a multispeed alternating current motor which will operate accurately over a wide range of motor voltages.

Yet another object of the present invention is the provision of a starting control circuit for an alternating current motor which utilizes relatively little electrical power.

Other objects, advantages, and novel features of the present invention will become apparent from the following detailed description of the invention when considered in conjunction with the accompanying drawings.

DESCRIPTION OF THE PREFERRED EMBODIMENT

The referenced copending application describes a starting control circuit for an A.C. motor. The present invention provides a method of adapting the methods used in the referenced copending application to control start windings of a two-speed motor at the appropriate motor speed for the selected winding.

A single phase, two-speed induction motor is normally provided with two run windings and two start windings. The two sets of windings are wound to produce different numbers of magnet poles. Thus, when one set of windings is energized, the motor will run close to the synchronous speed for the pole and supply frequency combination of that winding; and when the other set of windings is energized, the motor will run close to a different synchronous speed determined by the second pole number.

For example, a motor wound with a set of 2 pole windings and a set of 4 pole windings will run at about 3500 RPM wwhen the 2 pole windings are connected to a 60 Hz supply and about 1750 RPM when the 4 pole windings are connected to the same supply.

To start this type of motor on either set of windings, it is necessary to connect the appropriate start winding to the supply and to leave it connected until the motor speed reaches approximately 80% of synchronous speed. Since the synchronous speeds for the two windings are different, the cut-out speed of the two start windings will be different.

Figure 1:
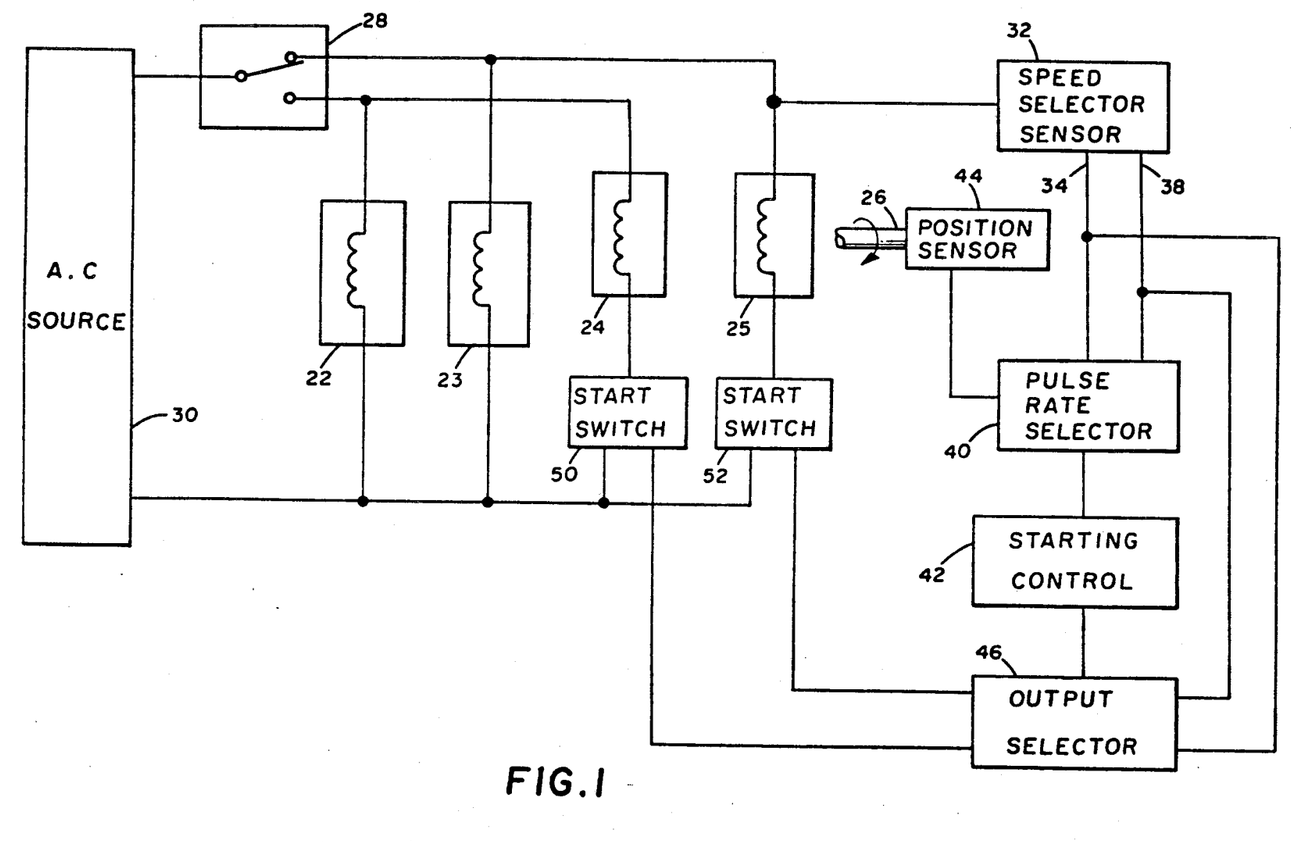
FIG. 1 shows the starting control circuit of the present invention in block diagram form.
Figure 7:
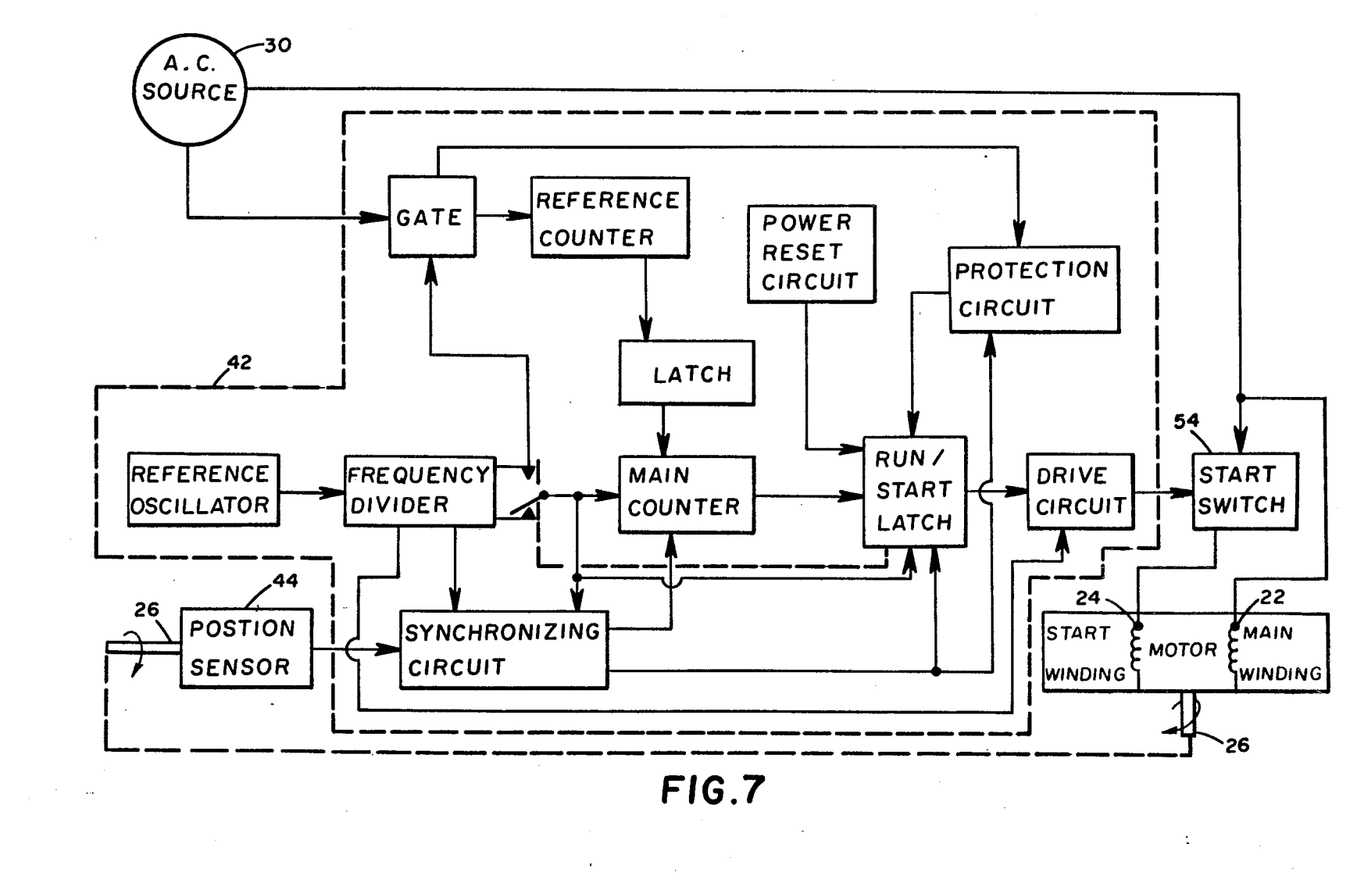
FIG. 7 shows the circuit embodying the invention of the referenced copending application in block diagram form.

FIG. 7 is a block diagram of the invention of the referenced copending application. The operation of the circuitry contained in what is termed the start controller 42 in the present specification is explained fully in the referenced copending application. It is important to note that the position sensor 44 provides a sensor signal to the start controller which is indicative of the position of the mechanical rotational output 26. The sensor signal is processed by the start controller 42 along with an output reference frequency signal from a reference oscillator contained within the start controller 42 to ultimately produce a control signal which is applied to the start switch 54. The A.C. source 30 is connected to the start controller 42 as shown in FIG. 7. This connection is not shown in FIG. 1 for purposes of simplifying the description of the present invention. In the present invention, a speed selector sensor 32, as shown in FIG. 1, senses the connection determined by a speed selector 28 and produces a speed selection signal indicative thereof. A pulse rate selector is connected between the position sensor 44 and the start controller 42, and is responsive to the speed selection signal and to a sensor signal from the position sensor 44 for producing a pulse rate signal. This pulse rate signal is different for the two sets of windings and is applied to the start controller 42, which produces the control signal. An output selector 46 is connected to the start controller 42, and in response to the speed selection signal, applies the control signal to the proper start switch 50 or 52.

Therefore, the starting control circuit of the present invention accepts pulses from a rotation sensing device on the shaft of the motor and either divides these pulses by a factor determined by the ratio of the number of poles in the two windings or feeds them directly to the start controller means as described in the referenced copending application. The output of the referenced copending application circuit is fed through the output selector circuit to either a starting switch or energizing means for the first start winding or a starting switch for the second start winding. As a result, the circuit from the referenced copending application will, when the first run winding is energized, provide a control signal to energize the first start winding and will deenergize this first start winding when the motor speed reaches 80% of the synchronous speed for this first set of windings. Further, when the second run winding is energized, a control signal will be provided to energize the second start winding and to deenergize it when the motor speed reaches 80% of the synchronous speed for the second set of windings.

The circuit of the referenced copending application will further provide signals to reenergize the appropriate start winding if the speed is decreased to less than 50% of the synchronous speed of the set of windings in use.

Referring to the drawings, the preferred embodiment of the present invention will be described in detail.

In FIG. 1, a two-speed alternating current motor includes two main or run windings 22 and 23, two start windings 24 and 25 and a mechanical rotational output 26. Although it is not shown in the drawings, it should be understood by those skilled in the art that capacitors may be placed in series with the start windings 24 and 25 to further increase the phase displacement of currents between windings 22 and 24 and 23 and 25, in a known manner. The motor is powered by an alternating current source 30.

Typically, one set of windings, such as 22 and 24, are low speed windings and the other set, such as 23 and 25, are high speed windings. A switch 28 or speed selector means connects one of the sets of windings to the A.C. source 30.

Sensor means is provided in the form of position sensor 44 for sensing a predetermined amount of rotational movement of the mechanical rotational output 26 and producing a sensor signal indicative thereof. The position sensor 44 includes a magnet wheel and a Hall Effect detection circuit shown in detail in FIG. 2. Briefly, the position sensor 44 serves to provide an output pulse with each predetermined amount of rotation of the motor output 26, depending on the number of poles in the motor.

In the preferred embodiment of the present invention, the position sensor 44 is designed to produce a number of output pulses equal to the larger number of motor poles for each 360 degrees of rotation of the mechanical rotational output 26. For example, in a motor having 4 poles in a 2/4 pole motor, the sensor 44 would be designed to produce an output pulse with each 90 degress of rotation of the mechanical rotational output 26.

A speed selector sensing means 32 for sensing the position of the speed selector switch 28 is provided. This circuit 32 provides a high signal level at output 34 when the speed selector switch 28 is in the high speed position and a high signal level at output 38 when the switch 28 is in the low speed position.

A pulse rate selector means 40 is provided which divides the pulse rate output or sensor signal from the position sensor 44 by either 1 or 2, depending on the signals from the speed selector sensor 32. This arrangement is used where the ratio of the number of poles in the two sets of windings is 1:2, as in the case of a 2/4 pole motor. For other pole combinations, a modified circuit would be used to provide the same ratio as the ratio of the number of poles, e.g., 2:3 for a 4/6 pole motor.

An output selector means 46 routes output pulses from the start controller means 42 of the referenced copending application to the appropriate energizing means 50 or 52. This routing is determined by the previously discussed signals which are, in turn, responsive to the speed selector switch 28.

When power is applied to the motor, the speed selector switch 28 will route the current to the set of windings connected thereto to obtain the desired speed. At this time, start switches 50 and 52 are open. Power is also applied to the start controller means 42, which produces a train of output pulses or control signals suitable for operating the selected start switches 50 or 52. The speed selector sensor 32 feeds a signal to the output selector 46, which directs this pulse train to the appropriate start switch for the speed selected. The start winding for that speed is thus energized and the motor accelerates. The position sensor 44 will then start to produce a sensor signal. This sensor signal is then divided by the value determined by the pulse rate selector 40 in response to the output of the speed selector sensor 32. In the case of a 2/4 pole motor selected to run on the 2 pole speed, the pulse rate of 4 pulses per revolution is divided by 2; when selected to run on the 4 pole speed, the pulse rate is divided by 1.

The pulse rate signal is fed to start controller 42. When start controller 42 determines that the pulse rate signal indicates a motor speed of 80% of synchronous speed for the selected pole combination, it will cut off the output pulse train or control signal, which will then allow the selected start switch to open. The motor will then accelerate to its normal operating speed on the run winding. If the motor is overloaded to the point where its speed drops to 50% of synchronous speed, circuit 42 will reenergize the start winding.

Figure 2:
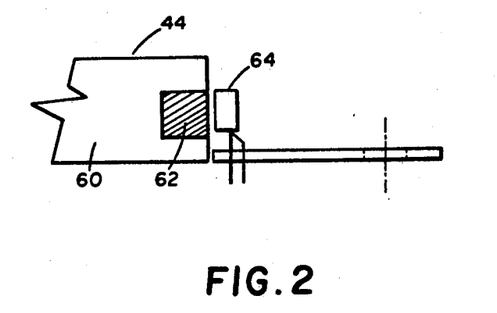
FIG. 2 shows the position sensor of the present invention.

FIG. 2 shows a position sensor suitable for use with the circuit of the present invention. A disc or wheel 60 has one or more magnets 62, preferably mounted thereon and in cooperative relationship with a Hall Effect detection circuit 64, to activate the Hall Effect detection circuit 64 when the disc 60 completes a predetermined amount of rotational movement. The disc 60 is mounted concentrically on mechanical rotational output 26 and adapted to rotate therewith. It should be understood that a variety of alternative position sensors could be utilized with the control circuit of the present invention. For example, a stationary single magnet could be mounted within a hollow notched wheel such that the circumference of the wheel would be interposed between the detection circuit and the magnet until the notch appeared. Thus, rather than having a plurality of magnets, a plurality of notches or openings in the surface of the wheel could be utilized to trigger the detection circuit. In addition, instead of Hall Effect detection circuits, it is well within the scope of the present invention to utilize other pickups such as capacitive or optical devices to detect the position of the mechanical rotational output of the motor. Hall Effect detection circuit 64 is preferably a type UGN-3019T or UGS-3019T digital switch manufactured by the Semiconductor Division of Sprague Electric Co., Concord, N.H.

Figure 3:
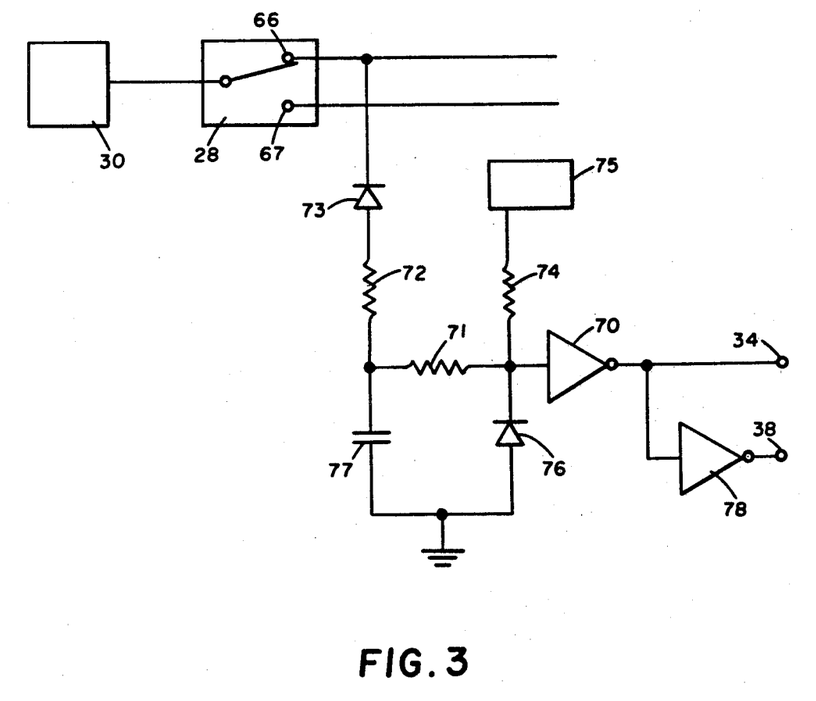
FIG. 3 shows a detailed circuit diagram of the speed selector sensor utilized in the starting control circuit of the present invention.

FIG. 3 shows a detailed circuit diagram of the speed selector sensor 32. The speed selector 28 is a single-pole, double-throw switch and the speed selector sensing means 32 is connected to only one of the terminals 66 and 67, as shown. A first inverter 70 has its input connected to resistors 71 and 72 and diode 73. Biasing resistor 74 connects the input of the inverter 70 to a voltage source 75 and diode 76 connects the input to ground. Filter capacitor 77 connects the juncture of resistors 71 and 72 to ground. When terminal 66 of the speed selector 28 is connected to the A.C. source 30, the output of inverter 70 and therefore output terminal 34 will be at a logical high. Inverter 78 connects the output of inverter 70 to output terminal 38, thereby causing output terminal 38 to be at a logical low. When the switch of the speed selector 28 is changed to terminal 67, output 34 will be at a logical low and output 38 will be at a logical high. The outputs 34 and 38 form the speed selection signal.

Figure 4:
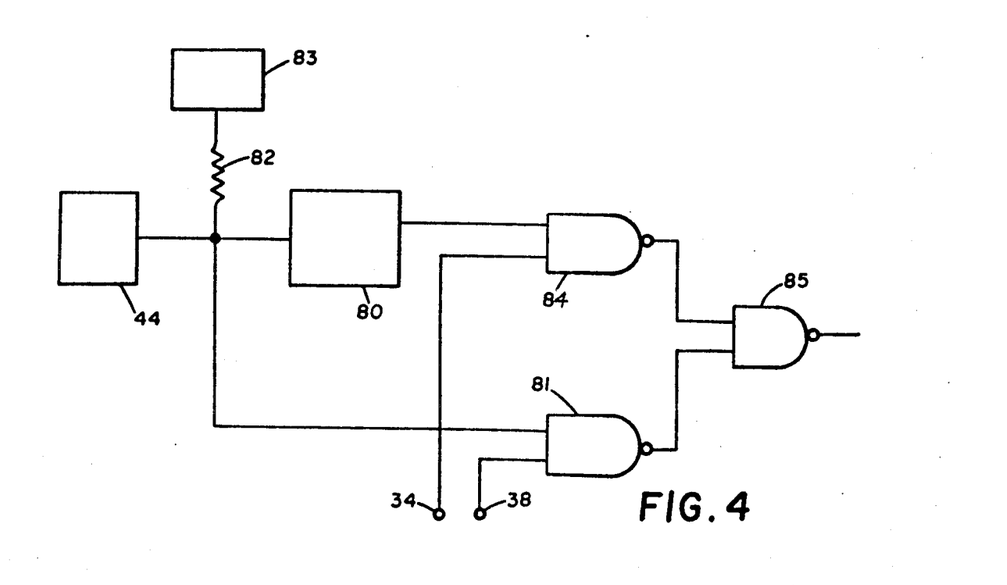
FIG. 4 shows a detailed circuit diagram of the pulse rate selector utilized in the starting control circuit of the present invention.

FIG. 4 shows a detailed circuit diagram of the pulse rate selector 40. The pulses from the sensor 44 are applied to the input of a D-type flip-flop 80 and to one input of a NAND gate 81. A biasing resistor 82 connects the inputs of the flip-flop 80 and NAND gate 81 to a voltage source 83. The other input of NAND gate 81 is connected to terminal 38 of the speed selector sensor 32. The output of the flip-flop 80 is connected to one input of a NAND gate 84 and the other input is connected to terminal 34 of the speed selector sensor 32. The output of NAND gates 81 and 84 are connected to the inputs of NAND gate 85. The output of NAND gate 85 is connected to the input of circuit 42, which is connected to a synchronizing circuit in start controller 42. The flip-flop 80 divides the pulses from the sensor 40 by 2 and the new pulses or the original pulses appear at the output of the pulse rate selector 40, depending upon the speed selection signal from the speed selector sensor 32. The output of NAND gate 85 is the pulse rate signal. The pulse rate signal is received by the start controller means 42, which produces a control signal. Flip-flop 80 and the direct connection between the sensor 40 and NAND gate 81 comprise a converter means for converting the sensor signal to two pulse rate signals. NAND gates 81, 84 and 85 comprise logic means for outputting a selected pulse rate signal.

Figure 5:
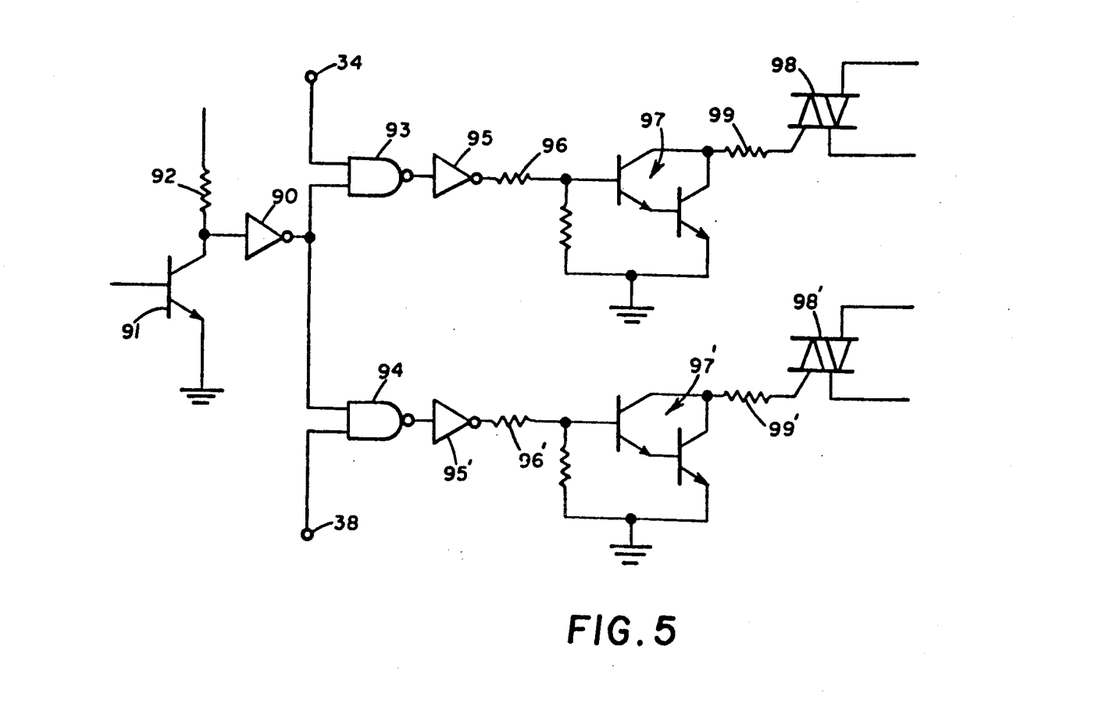
FIG. 5 shows a detailed circuit diagram of the output selector utilized in the starting control circuit of the present invention.

FIG. 5 shows a detailed circuit diagram of the output selector 46. The output of circuit 42 is applied to the input of inverter 90 through transistor 91 and resistor 92. A pair of NAND gates 93 and 94 have one of their inputs connected to the output of inverter 90. The other input of NAND gate 93 is connected to terminal 34 of the speed selector sensor 32 and the other input of NAND gate 94 is connected to terminal 38. The outputs of NAND gates 93 and 94 are connected to identical circuits. Accordingly, similar numerals will be utilized to identify like components. Each of the outputs of NAND gates 93 and 94 is applied to an inverter 95 and $95^1$ and then through resistors 96 and $96^1$ to Darlington pairs of switching transistors 97 and $97^1$. The outputs from transistors 97 and $97^1$ are connected to triacs 98 and $98^1$ through resistors 99 and $99^1$. The output selector 46 applies the control signal received from circuit 42 to one of the start switches 50 or 52. The inverter 90, NAND gates 93 and 94 and inverters 95 and $95^1$ comprise the logic means for outputting the control signal. Transistors 97 and $97^1$ and triacs 98 and $98^1$ form driver circuits for each of the start switches.

Figure 6:
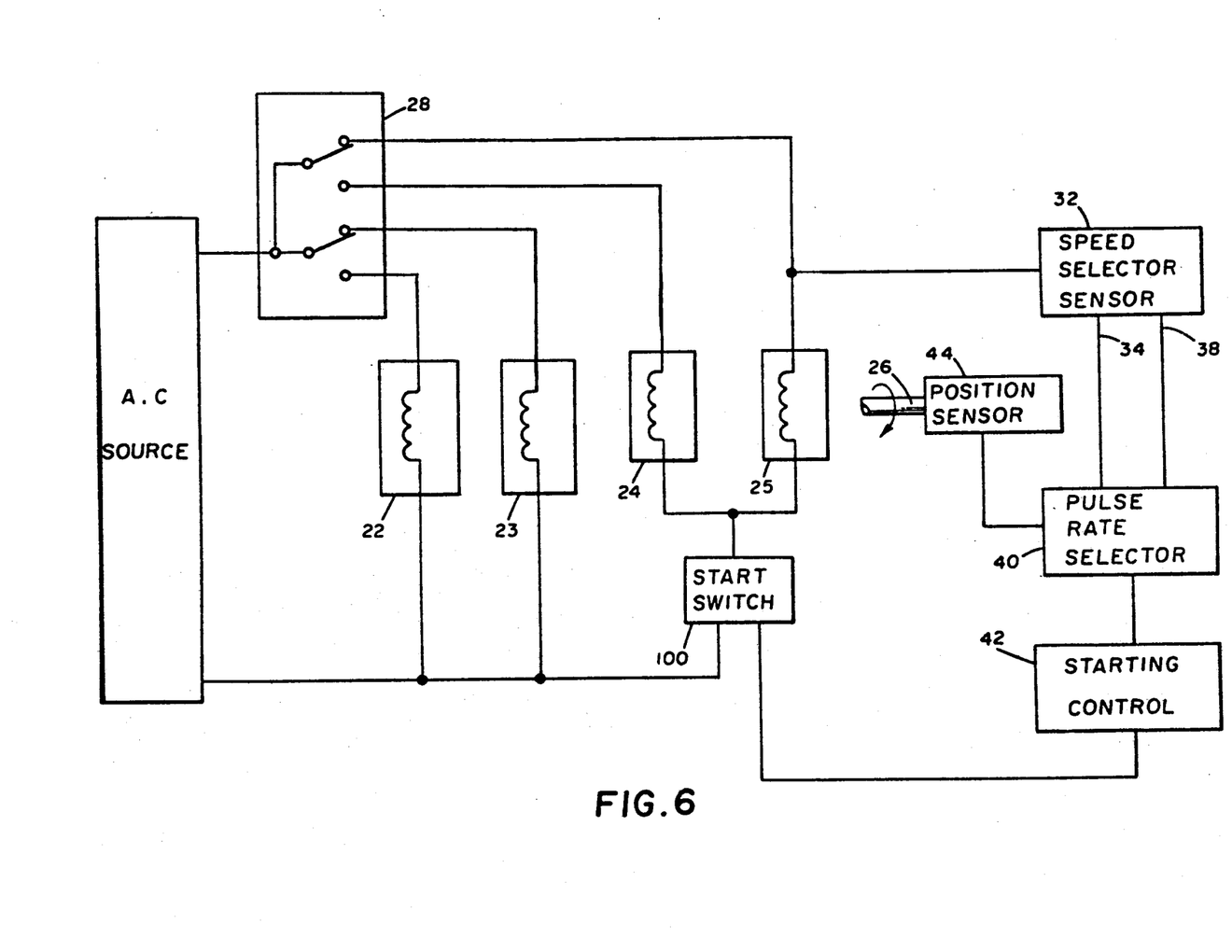
FIG. 6 shows an alternative embodiment of the present invention in block diagram form.

FIG. 6 shows an alternative embodiment of the present invention. By using a double-pole, double-throw switch for the speed selector 28, only one start switch 100 is needed for start windings 24 and 25. This eliminates the need for the output selector 46 and the output of circuit 42 can be applied directly to the start switch 100. The alternative embodiment of FIG. 6 or the preferred embodiment of FIG. 5 may be utilized depending upon the physical placement of the switches, motor and circuits and limitations upon the number of wires for interconnections.

Since the starting control circuit of the present invention utilizes MOS integrated circuit technology, the circuit operates at a very low level which does not significantly add to the input power required by the motor. Since the circuit utilizes primarily digital components, it is both extremely accurate in operation and yet economical to manufacture. As was mentioned before, the circuit may be utilized over a wide range of motor sizes and will operate accurately over a wide range of line frequencies and motor voltages.

While there has been described what is at present considered to be the preferred embodiment of the present invention, it will be obvious to those skilled in the art that various changes and modifications may be made therein, without departing from the invention, and it is, therefore, aimed in the appended claims to cover all such changes and modifications as fall within the true spirit and scope of the invention.

We claim:

1. A starting control circuit for connecting a multi-speed alternating current motor having at least two run windings and at least two start windings and a mechanical rotational output to an alternating current source comprising;
   speed selector means for connecting one of said run windings and start windings to said alternating current source;
   speed selector sensing means connected to said speed selector means for sensing the connection determined by said speed selector means and for producing a speed selection signal indicative thereof;
   sensor means coupled to the mechanical rotational output for directly sensing a predetermined amount of rotational movement of the mechanical rotational output and for producing a sensor signal indicative thereof;
   pulse rate selector means responsive to said speed selection signal and to said sensor signal for producing a pulse rate signal;
   start controller means responsive to said pulse rate signal for producing a control signal; and
   energizing means connected to said start windings and responsive to said control signal for connecting and disconnecting said alternating current source to said selected one of said start windings in response to the control signal of said start controller means.

2. The starting control circuit described in claim 1, wherein said energizing means comprises:
   a plurality of start switches such that each start winding is connected to a start switch,
   an output selector means connected to said start controller means and responsive to said speed selection signal for selecting one of said start switches, said output selector means applying said control signal to said selected start switch.

3. The starting control circuit described in claim 1, wherein said speed selector sensing means has at least two outputs such that a first output is at a logical high and a second output is at a logical low for a first selected start winding, and said first output is at a logical low and said second output is at a logical high for a second selected start winding.

4. The starting control circuit described in claim 3, wherein said pulse rate selector means comprises:
   first and second inputs connected to said first and second outputs, respectively, of said speed selector sensing means;
   converter means connected to said sensor means for converting said sensor signal to at least two pulse rate signals, each proportioned to the number of poles on each of said run windings;
   logic means responsive to said pulse rate signals and connected to said inputs for ouputting one of said pulse rate signals corresponding to said selected start winding.

5. The starting control circuit described in claim 3, wherein said output selector means comprises:
   first and second inputs connected to said first and second outputs, respectively, of said speed selector sensing means;
   a third input connected to said start controller means for receiving said control signal;
   logic means connected to said first, second and third inputs for outputting said control signal to one of a plurality of driver circuits connected to said plurality of start switches, each start switch having one driver circuit connected to it.

6. A starting control circuit for connecting a two-speed alternating current motor having two run windings and two start windings and a mechanical rotational output to an alternating current source comprising;
   speed selector means for connecting one of said run windings and start windings to said alternating current source;
   speed selector sensing means connected to said speed selector means for sensing the connection determined by said speed selector means and for producing a speed selection signal indicative thereof;

sensor means for sensing a predetermined amount of rotational movement of the mechanical rotational output and for producing a sensor signal indicative thereof;

pulse rate selector means responsive to said speed selection signal and to said sensor signal for producing a pulse rate signal;

start controller means responsive to said pulse rate signal for producing a control signal;

a first start switch connected to one of said start windings and a second start switch connected to the other of said start windings responsive to said control signal for connecting and disconnecting said alternating current source to said start windings;

an output selector means connected to said start controller means and responsive to said speed selection signal for selecting one of said first and second start switches, said output selector means applying said control signal to said selected start switch.

7. The starting control circuit described in claim 6, wherein said speed selector sensing means has two outputs such that a first output is at a logical high and a second output is at a logical low for a first selected start winding, and said first output is at a logical low and said second output is at a logical high for a second selected start winding.

8. The starting control circuit described in claim 7, wherein said pulse rate selector means comprises;
 first and second inputs connected to said first and second outputs, respectively, of said speed selector sensing means;
 converter means connected to said sensor means for converting said sensor signal to at least two pulse rate signals, each proportioned to the number of poles on each of said run windings;
 logic means responsive to said pulse rate signals and connected to said first and second inputs for outputting one of said pulse rate signals corresponding to said selected start winding.

9. The starting control circuit described in claim 8, wherein said output selector means comprises;
 first and second inputs connected to said first and second outputs, respectively, of said speed selector sensing means;
 a third input connected to said start controller means for receiving said control signal;
 logic means connected to said first, second and third inputs for outputting said control signal to one of two driver circuits connected to said first and second start switches, each start switch having one driver circuit connected to it.

10. The starting control circuit described in claim 6, wherein said speed selector means is a single-pole, double-throw switch.

11. A starting control circuit for connecting a two-speed alternating current motor having two run windings and two start windings and a mechanical rotational output to an alternating current source comprising;
 speed selector means for connecting one of said run windings and start windings to said alternating current source;
 speed selector sensing means connected to said speed selector means for sensing the connection determined by said speed selector means and for producing a speed selection signal indicative thereof;
 sensor means coupled to the mechanical rotational output for directly sensing a predetermined amount of rotational movement of the mechanical rotational output and for producing a sensor signal indicative thereof;
 pulse rate selector means responsive to said speed selection signal and to said sensor signal for producing a pulse rate signal;
 start controller means responsive to said pulse rate signal for producing a control signal;
 a start switch connected to said start windings and responsive to said control signal for connecting and disconnecting said alternating current source to said start windings in response to the control signal of said start controller means.

12. The starting control circuit described in claim 11, wherein said speed selector sensing means has at least two outputs such that a first output is at a logical high and a second output is at a logical low for a first selected start winding, and said first output is at a logical low and said second output is at a logical high for a second selected start winding.

13. The starting control circuit described in claim 12, wherein said pulse rate selector means comprises;
 first and second inputs connected to said first and second outputs, respectively, of said speed selector sensing means;
 converter means connected to said sensor means for converting said sensor signal to two pulse rate signals, each proportioned to the number of poles on each of said run windings;
 logic means responsive to said pulse rate signals and connected to said inputs for outputting one of said pulse rate signals corresponding to said selected start winding.

14. The starting control circuit described in claim 11, wherein said speed selector means is a double-pole, double-throw switch.

15. An electronic starting control circuit for connecting a multispeed alternating current motor having at least two start windings and a mechanical rotational output to an alternating current source comprising:
 speed selector means to select one of the available speeds and a corresponding start winding for operation,
 sensor means for sensing the rotational movement of the mechanical rotational output and for producing a sensor signal indicative thereof,
 switch means in circuit with the selected start winding to electrically energize said winding, and
 control means in circuit with the speed selector means, sensor means, and switch means for determining when the mechanical rotational output has reached a predetermined portion of the selected speed and switching the selected start winding in response thereto.

16. The circuit of claim 15 wherein the sensor means is coupled to the mechanical rotational output for directly sensing the angular velocity thereof.

17. The circuit of claim 16 wherein the motor has a run winding for each speed associated with each start winding.

18. The circuit of claim 17 wherein the switch means includes a switch in circuit with each start winding.

19. The circuit of claim 17 wherein the switch means includes a switch in circuit with all of the start windings.

20. The circuit of claim 17 wherein the control means includes a pulse rate selector means in circuit with the speed selector means and the sensor means to adjust the sensor signal in response to the selected speed.

21. The circuit of claim 20 wherein the sensor signal comprises a series of pulses, and wherein the pulse rate selector means adjusts the series of pulses in the same proportion as the selected speed to a base speed.

22. An electronic starting control circuit for connecting a multispeed alternating current motor having at least two start windings and a mechanical rotational output to an alternating current source comprising:
   means to select one of said speeds for operation,
   means to switch said start windings in and out of circuit, and
   means coupled to the mechanical rotational output to directly sense the speed of the mechanical rotational output, said switching means being responsive to at least the speed sensing means and having means to switch the power to said start windings at a pre-determined proportion of the selected speed.

23. The circuit of claim 22 wherein the switching means comprises a switch in circuit with the start windings and a pulse rate selector means, the sensor means having means to produce a series of pulses indicative of motor speed and the pulse rate selector means having means to adjust the series of pulses in the same proportion as the selected speed to a base speed.

* * * * *

UNITED STATES PATENT AND TRADEMARK OFFICE
CERTIFICATE OF CORRECTION

PATENT NO. : 4,453,118
DATED : June 5, 1984
INVENTOR(S) : Graham R. Phillips and Marvin J. Fisher It is certified that error appears in the above—identified patent and that said Letters Patent is hereby corrected as shown below:

Column 1, Line 7, "copening" should read -- copending -- .

Column 3, Line 53 "3500 RPM wwhen" should read -- 3500 RPM when -- .

Column 7, Line 17, "$95^1$ and then through resistors 96 and $96^1$" should read -- 95' and then through resistors 96 and 96' -- .

Column 7, Line 18, "97 and $97^1$" should read -- 97 and 97' -- .

Column 7, Line 19, "97 and $97^1$" should read -- 97 and 97' --

Column 7, Line 20, "$98^1$ through resistors 99 and $99^1$." should read -- 98' through resistors 99 and 99'. --

Column 7, Line 23, "95 and $95^1$" should read -- 95 and 95' --

Column 7, Line 25, "97 and $97^1$ and triacs 98 and $98^1$" should read -- 97 and 97' and triacs 98 and 98' -- .

Signed and Sealed this

Fifth Day of February 1985

[SEAL]

Attest:

DONALD J. QUIGG

Attesting Officer    Acting Commissioner of Patents and Trademarks